United States Patent
Kluchinski et al.

(10) Patent No.: US 9,792,090 B2
(45) Date of Patent: Oct. 17, 2017

(54) METHOD AND APPARATUS FOR ACHIEVING EFFICIENT UPGRADE OF INSURANCE PRODUCTS

(75) Inventors: Dave Kluchinski, Long Valley, NJ (US); Art Agostinelli, Wind Gap, PA (US); Susan Wong, Flemington, NJ (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 880 days.

(21) Appl. No.: 11/592,514

(22) Filed: Nov. 3, 2006

(65) Prior Publication Data

US 2008/0109789 A1 May 8, 2008

(51) Int. Cl.
G06F 9/44 (2006.01)
G06F 9/445 (2006.01)
G06Q 40/08 (2012.01)

(52) U.S. Cl.
CPC ............ G06F 8/20 (2013.01); G06F 9/44521 (2013.01); G06Q 40/08 (2013.01)

(58) Field of Classification Search
CPC ...... G06Q 40/00; G06Q 40/08; G06F 17/243; G06F 17/248
USPC .................................. 717/120–123, 168–178
See application file for complete search history.

(56) References Cited

U.S. PATENT DOCUMENTS

| | | | | |
|---|---|---|---|---|
| 6,718,535 B1 * | 4/2004 | Underwood | .................. | 717/101 |
| 6,871,345 B1 * | 3/2005 | Crow et al. | .................. | 717/175 |
| 7,519,905 B2 * | 4/2009 | Kougiouris et al. | .......... | 715/237 |
| 7,631,299 B2 * | 12/2009 | Kannenberg | .................. | 717/121 |
| 2002/0133392 A1 | 9/2002 | Angel et al. | | |
| 2002/0156757 A1 | 10/2002 | Brown | | |
| 2003/0023473 A1 * | 1/2003 | Guyan et al. | ...................... | 705/9 |
| 2003/0056151 A1 * | 3/2003 | Makiyama | ...................... | 714/38 |
| 2003/0191758 A1 | 10/2003 | Majewski et al. | | |
| 2003/0212831 A1 * | 11/2003 | Yoshio | .......................... | 709/310 |
| 2004/0236943 A1 * | 11/2004 | Edwards et al. | .............. | 713/161 |
| 2005/0114310 A1 | 5/2005 | Long | | |
| 2006/0075396 A1 * | 4/2006 | Surasinghe | .................... | 717/168 |
| 2006/0235730 A1 * | 10/2006 | Politano et al. | .................. | 705/4 |
| 2007/0055760 A1 * | 3/2007 | McCoy et al. | ................. | 709/223 |

OTHER PUBLICATIONS

Buck-Emden et al., "mySAP CRM The Official Guidebook to SAP CRM 4.0", SAP Press, Mar. 2004, 45pg.*
International Search Report, PCT Appln. No. PCT/US07/81927, Jun. 6, 2008.

* cited by examiner

Primary Examiner — Ryan Coyer
(74) Attorney, Agent, or Firm — Troutman Sanders LLP

(57) ABSTRACT

A system for managing products comprising a plurality of components is provided. In one embodiment, the system further comprises a plurality of parameters governing the interaction among said components and an interface for receiving user input concerning said components; wherein said components and parameters are objects defined and stored externally; said parameters are defined based on possible user input concerning one or more of said components: and one or more of said components and parameters are loaded into the system, revised or removed without rewriting existing software.

12 Claims, 3 Drawing Sheets

METHOD AND APPARATUS FOR ACHIEVING EFFICIENT UPGRADE OF INSURANCE PRODUCTS

FIELD OF THE INVENTION

This invention relates in general to software systems for managing product information and in particular to a software system that allows addition or alteration of products or product parameters without changing the user interface, and without requiring significant modifications to existing software systems.

BACKGROUND OF THE INVENTION

With ever-increasing demand for flexibility in introducing new product offerings, many industries, including the insurance industry, require software sufficiently dynamic to allow for adding new products and new properties of existing products without major alteration to their internal computer systems. In the current state, these computer systems have embedded products, product properties, and conditions by which the two are related, directly into program logic. This approach typically requires software rewrites or significant software upgrades as new product offerings or product properties are developed and introduced. These modifications to the programming infrastructure can create lengthy delays in bringing new products to market.

SUMMARY OF THE INVENTION

One solution to the foregoing problems is to implement software systems that are driven by externally defined properties and parameters. Such systems present information in a manner that is useful to users familiar with particular industry specific software, e.g., the insurance industry, but who may not be well versed in the technology required to develop and implement such systems. In this way, products and product parameters can be added or altered without changing the user interface, and without requiring significant modifications to existing computer software systems.

One embodiment of the present invention comprises a system for managing products comprising a plurality of components. The system further comprises a set of parameters governing the interaction among said components and an interface for receiving user input concerning said components. The components and are defined and stored externally. The parameters are defined based on possible user input concerning one or more of said components. One or more of the components and parameters are loaded into the system, revised or removed without rewriting existing software. One or more of said components are automatically disabled based on user input.

In one embodiment, the products comprise insurance products and the components may comprise questions, responses for said questions, and questions to be disabled based on each response.

In another embodiment, the system may further comprise an interface displaying components loaded or disabled, or an interface displaying questions affected by the external parameters.

In yet another embodiment, questions and responses are presented in a specific order to the user during product configuration.

In yet another embodiment, the parameters comprise information about how components should be displayed.

Another embodiment of the present invention comprises a method of managing products. The product comprises a plurality of components. The method comprises the steps of: externally defining and storing said components; externally defining and storing a plurality of parameters based on possible user input concerning one or more of said components, said parameters governing the interaction among said components; and disabling one or more of said components without rewriting existing software.

In one embodiment, the products comprise insurance products.

In another embodiment, the components comprise questions, responses for said questions, and questions to be disabled based on each response.

In yet another embodiment, the method further comprises the step of maintaining an interface for displaying components enabled or disabled.

In yet another embodiment, the method further comprises the step of maintaining an interface for displaying questions affected by the parameters.

DETAILED DESCRIPTION OF PREFERRED EMBODIMENTS

Figure 1:
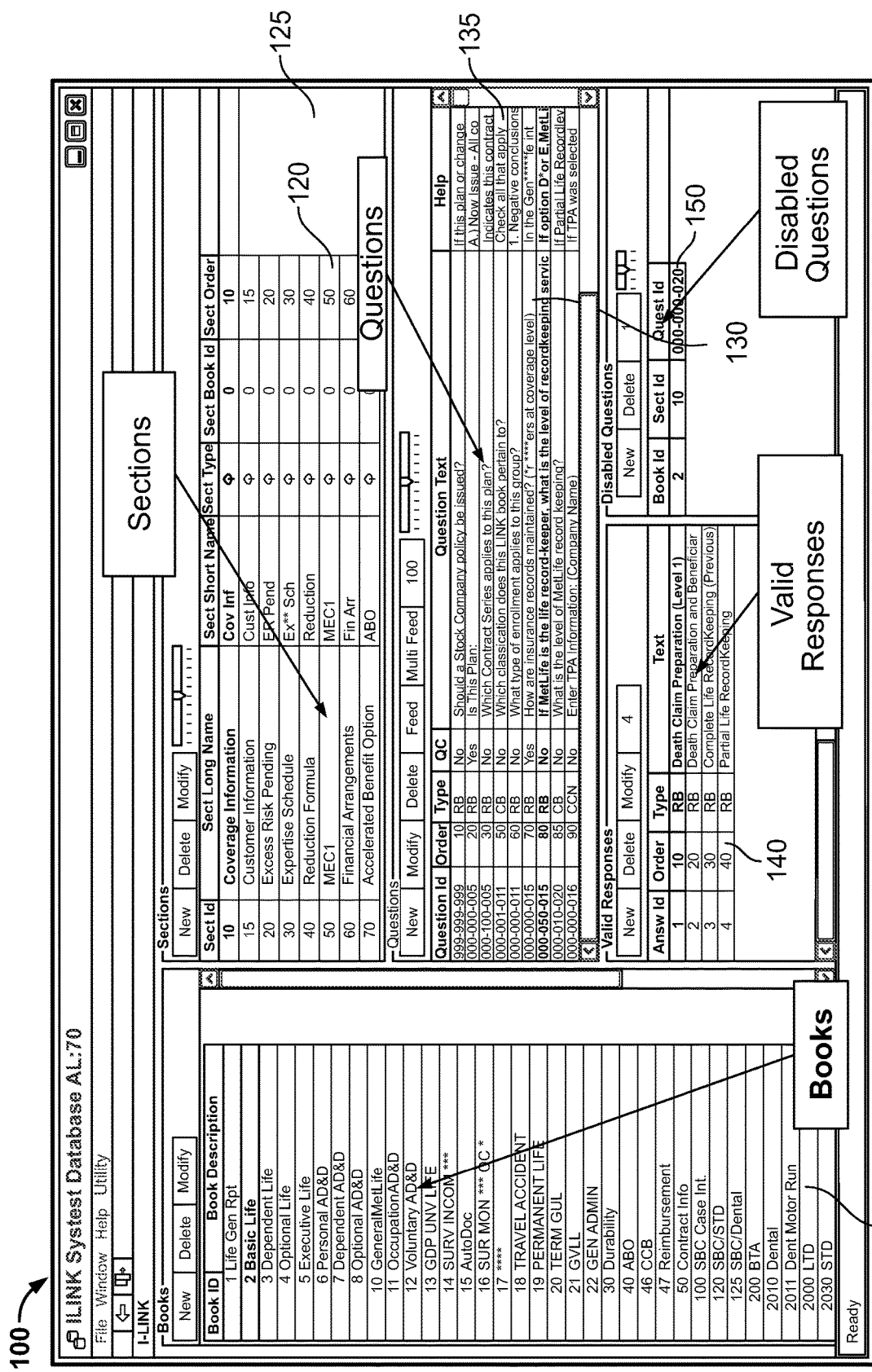
FIG. 1 shows a representation of the software program interface in one embodiment of the invention.

In one embodiment, a user interacts with a software application through a program interface. One embodiment of the program interface 100 is shown in FIG. 1. The program interface receives data from an external source that can be used to present a user with relevant data in a particular format. The data may include information relating to a certain product. Each product may also consist of one or more product categories, which may also have one or more sub-categories. Each category or sub-category may also have associated with it one or more parameters and one or more questions. By way of example only, the data may include the name of a product, the type of product, the location of relevant product data or files, and the number of associated product properties. Further, the data may also specify how product information is to be displayed, e.g., in frames, in a tree format, list format, icon format, etc.

The data received by the program interface 100 may also include product properties. These properties can describe the elements of a particular product. For example, they may include all of the individual components of the product, questions related to the product, user selections related to the product, and the format that the data should have when displayed. By way of example only, product properties may include customer information, coverage information, benefits information, claim information, etc. The program interface 100 may receive these properties and display the product and the product's properties to a user based on parameters associated with the product or the particular property.

The data received by the program interface 100 may also include parameters that describe the relationship between a product and a particular property. These parameters dictate what properties are displayed to a user, how a user interacts with the program interface when selecting a product, the type of data associated with particular properties, and how the interface responds to the user's inputs. Further, the system may provide a relationship between multiple properties within a product, a relationship between various products, or a relationship between one property across various products. Changes to one property may cause previously associated properties to be disabled. Additionally, changes to one property may be automatically applied across a range of products, e.g., a change in marital status, or the number of children.

The data received by the program interface 100 may also include questions or information to be displayed to a user. These questions may be in the form of a radio button (e.g., only one answer per question); a series of checkboxes (e.g., one or more answers per question); a shortform answer (e.g., text input up to 254 characters); a longform answer (e.g., text input up to 3500, or more, characters); date (for making date entries); numeric (for making numeric entries); comments (used mainly for comments/help about a question.); and contacts (used to provide customer, Contacts and Claim Offices names, phone/fax numbers, etc.). In one embodiment, when a question is presented to a user, the user's answer or selection may disable one or more potential questions based on the user's answer.

This can be illustrated by way of a rudimentary example: if a question is presented as to marital status and the user's answer is "unmarried", then questions and properties associated with "married" may be disabled or not be displayed to a user. By way of converse example, if the answer to a marital status question is "married", then questions and properties associated with "married" may be enabled, while those associated with "individual products" may be disabled.

In one embodiment, the data, parameters, properties, and questions described above, can be divided into independently loadable or executable components. Further, parameters can provide the way in which these components are related to each other. For example, a product component may provide relevant product information (e.g., the general product parameters described above) and provide the location of related section components (described in detail below). Parameters may describe which section components are to be loaded/executed, when they should be loaded/executed, and how they should be displayed.

As a specific example, the interface 100 is comprised of five distinct components: Books 110, Sections 120, Questions 130, Valid Responses 140, and Disables Questions 150. A Book 110 may be a new insurance coverage or product. The Book component 110 provides functionality to add, modify, and remove Books from the interface 110. A new Product is created by simply adding a Book to the interface 100.

A Section component 120 provides functionality to add, modify, and remove Sections from the interface 100. A Section 120 provides the ability to further sub-divide a Book 110 into distinct and manageable sub-components. Once a user clicks on a Book in the Book frame 115, the Sections associated with that Book will be displayed in the Sections frame 125.

A Question component 130 provides functionality to add, modify, and remove Questions from the interface 100. Each Question 130 is related to a specific Section and Book. The Question component 130 can be set up to ask questions related to a product. Once a user clicks on a Section in the Section frame 125, the Questions associated with that Section will be displayed in the Questions frame 135.

In one embodiment, Questions are divided into the following main types:
Radio Button (Only one answer per question)
Checkbox (One or more answers per question)
Shortform (Text up to 254 characters)
Longform (Text up to 3500 characters)
Date (for making date entries)
Numeric (for making numeric entries)
Comments (used mainly for comments/help about a question.)
Contacts (used to capture Customer, Contacts and Claim Offices names, phone numbers, fax, etc.)

Valid Responses 140 are mainly used for Radiobuttons and Checkboxes Questions. For example, a user may want to provide the user with three choices for a response to a specific Question. If the question is associated with a Radiobutton, then the user can select only one response.

If the Question is a Checkbox, then the user can check any responses. Valid Responses 140 are also used to validation and to restrict specific type. For example, Valid Responses may be used to restrict the user to only entering numeric or date values.

In one embodiment, pre-established responses can be used to restrict answers to specific predetermined Questions. That is, responses to questions may be pre-established for various question types, e.g., Radiobuttons and Checkboxes. For example, a user may want to provide only three choices for a response to a specific question. These three choices can be added as radio buttons (if only one choice is allowed) or as Checkboxes (if any number of choices is allowed). Further, predefined data types can be used to validate and restrict answers to a particular type. For example, a response type may be implemented to restrict a user to entering only a particular data type, e.g., numeric or date values.

Further, responses received to any of the Questions 130 described above may automatically disable any number of questions from the universe of potential questions for a product or property. For example, if a question is answered "yes," other questions may be disabled based on the "yes" response. Furthermore, if a particular radio button is selected, or if a particular checkbox, or combination of checkboxes, is selected, other Questions may be automatically disabled.

Disabled Questions 150 are used to disable and delete any number of Questions, based on previous answered Questions. For example, if a Question is answered with Yes, other Questions may be disabled based on the Yes response.

Figure 2:
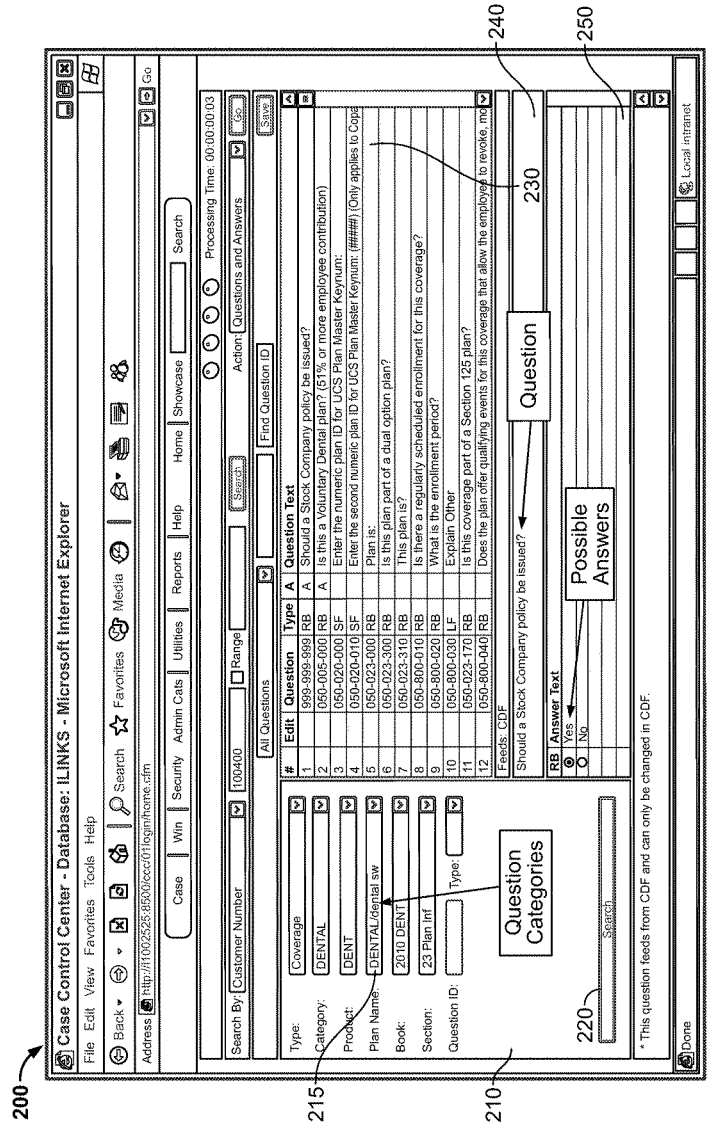
FIG. 2 shows the interface for maintaining questions in one embodiment of the invention.

FIG. 2 shows an interface 200 for maintaining Questions and possible answers in one embodiment of the invention. A user can search Questions from the interface 200 by first entering the relevant Question Categories 215 in the left frame 210 and then clicking on the "Search" button 220 at the bottom of the left frame 210. A series of Questions contained in the selected Categories will be displayed in the top right frame 230. A user can select a Question that is displayed and the text of that Question is then displayed in the middle right frame 240. All possible answers of the selected Question are also displayed in the bottom right frame 250.

The data components 110-150 above, as well as the parameters that provide the way in which these components are related to each other, are designed to be independently loadable. In one embodiment, the parameters are stored in a data table that can be accessed by the interface program 100. This provides users with the flexibility to add, modify, or remove software components or products within a program directly from the interface 100 without altering the application or business processes in an enterprise. For example, if a user desires to add a new type of product or Book, he can just directly load the externally-defined Book component into a current program using the interface 100. A new product may be loaded by selecting it from a pull down list in the interface 100. Such a selection may cause the automatic loading of the related product, components, properties, parameters, and questions. If a user wants to change certain properties of an existing product, he can revise the corresponding component externally and reload the revised component into the program though the interface 100. In short, the present system and method allows the addition/revision of products or product properties through the use of data external to the application interface.

Further, a user may add, modify, and remove sections 120 from the program interface 100 using the same method as described above. As noted above, a section can provide the ability to sub-divide a product into distinct and manageable sub-components. For example, a user may want to divide a particular insurance coverage into customer information, coverage information, benefits information, etc. Likewise, a user may also add, modify, and remove Questions from the program interface 100.

In the hierarchy of the present system and method, requesting a particular product may automatically enable and/or load a series of associated components, such as sections, properties, questions, and disabling conditions.

Figure 3:
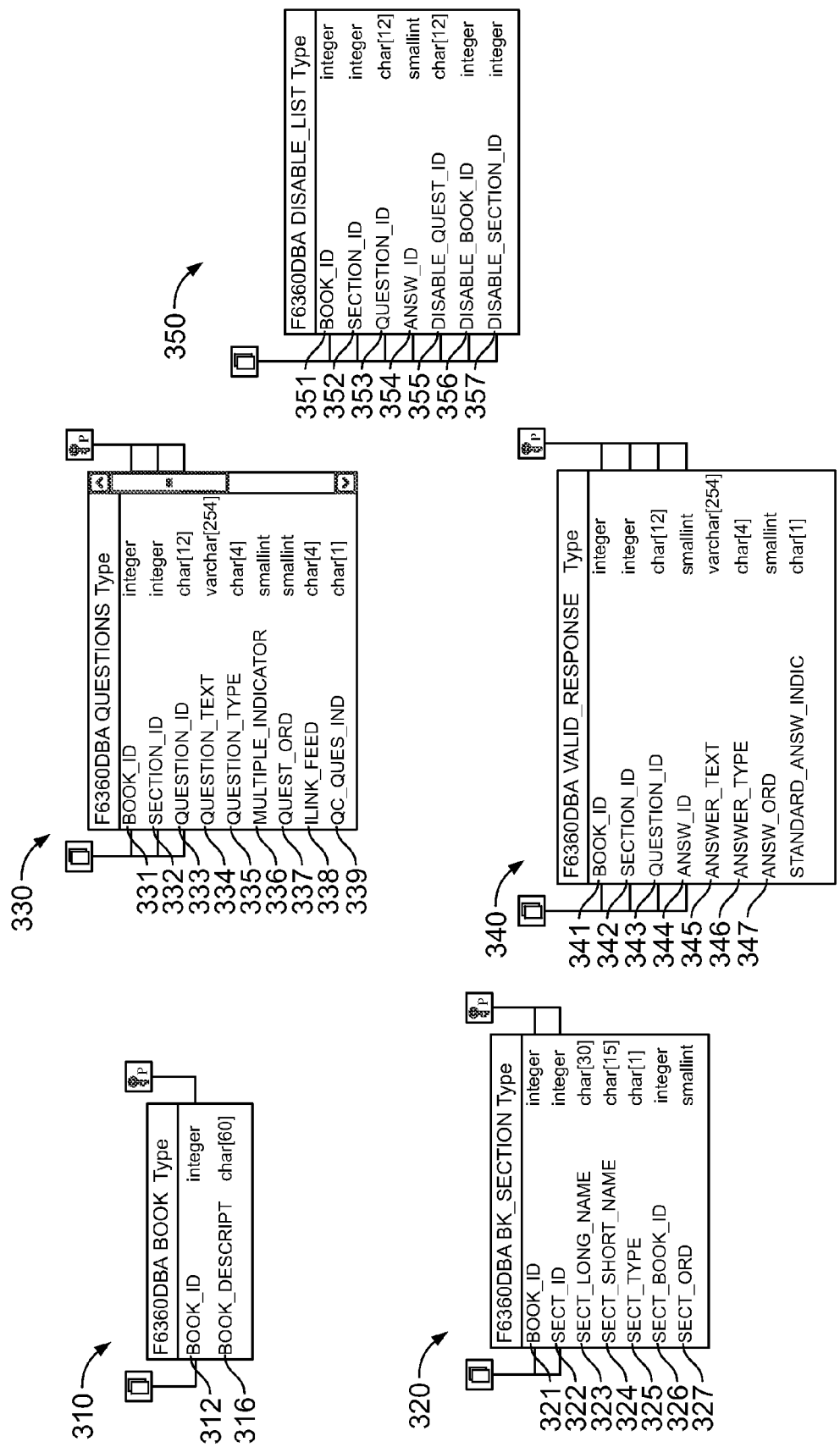
FIG. 3 shows the data elements required in one embodiment of the invention.

FIG. 3 shows the data elements required by the system to support the data components 110-150 in one embodiment of the invention. In this embodiment, a Book component 310 is represented by an integer BOOK_ID 312, which is an identification of the Book; and a 60-character string BOOK_DESCRIPT 316, which is a description of the Book's content.

A Section component 320 in FIG. 3's embodiment is represented by an integer BOOK ID 321, an integer SECT_ID 322, a 30-character string SECT_LONG_NAME 323, a 15-character string SECT_SHORT_NAME 324, a 1-character string SECT_TYPE 325, an integer SECT_BOOK_ID 326, and a small integer SECT_ORD 327. The BOOK_ID 321 variable identifies the Book component that contains the current Section. The SECT_ID 322 variable identifies the Section. The SECT_LONG_NAME 323 and SECT_SHORT_NAME 324 variables provide a long name and a short name of the Section, respectively. The SECT_TYPE 325 variable identifies a possible type of the Section among the various types defined by the user. The SECT_BOOK_ID 326 variable provides an identification for the BOOK_SECTION combination. The SECT_ORD 327 variable provides the order number of the Section within the Book.

A Question component 330 in FIG. 3's embodiment is represented by an integer BOOK ID 331, an integer SECT_ID 332, 12-character string QUESTION_ID 333, a 254-character string QUESTION_TEXT 334, a 4-character string QUESTION_TYPE 335, a small integer MULTIPLE_INDICATOR 336, a small integer QUEST_ORD 337, a 4-character string ILINK_FEED 338, and a 1-character string QC_QUES-IND 339. The BOOK_ID 331, SECT_ID 332 and QUESTION_ID 333 variable identify the Book, Section and Question, respectively. The QUESTION_TEXT 334 variable provides the text of the Question. The QUESTION_TYPE 335 variable identifies a possible type of the Question among the various types defined by the user. The MULTIPLE_INDICATOR 336 variable indicates whether the Question allows multiple answers. The QUEST_ORD 337 variable provides the order number of the Question within the Section. The ILINK_FEED 338 variable indicates whether a data translation has to be performed before transmission of data to subordinate software systems. The QC_QUES_IND 339 field indicates whether a user would run a report that will list all questions and answers for a given customer.

A Valid Responses component 340 in FIG. 3's embodiment is represented by an integer BOOK ID 341, an integer SECT_ID 342, a 12-character string QUESTION_ID 343, a small integer ANSW_ID 344, a 254-character string ANSWER_TEXT 345, a 4-character string ANSWER_TYPE 346, a small integer ANSW_ORD 347 and a 1-character string STANDARD_ANSW_INDIC 348. The BOOK_ID 341, SECT_ID 342, QUESTION_ID 343 and ANSW_ID 344 variable identify the Book, Section, Question and Valid Responses respectively. The ANSWER_TEXT 345 variable provides the text of the Valid Responses. The ANSWER_TYPE 346 variable identifies a possible type of the Valid Responses among the various types (for example: True/False, single-answer select and multiple-answer) defined by the user. The ANSW_ORD 347 variable provides the order number of the Valid Responses.

A Disabled Question component 350 in FIG. 3's embodiment is represented by an integer BOOK ID 351, an integer SECT_ID 352, 12-character string QUESTION_ID 353, a small integer ANSW_ID 354, an integer DISABLE_BOOK_ID 355, an integer DISABLE_SECT_ID 356, a 12-character string DISABLE_QUESTION_ID 357. These variables identify questions to be disabled based on an answer to another question.

In one embodiment, the question and answer format is maintained and presented by two software components. The first software component is an "administrative software" that maintains the data necessary to support the questions and responses presented to users by the programs interface (for example, interface 100). Questions, Valid Responses in the form of answers, and parameters by which other questions are disabled are stored as external data that is loaded/executed by the second software component based on the end user's responses.

While the above invention has been described with reference to certain preferred embodiments, the scope of the present invention is not limited to these embodiments. One skilled in the art may find variations of these embodiments which, nevertheless, fall within the spirit of the present invention, whose scope is defined by the claims set forth below.

What is claimed is:

1. A computer system managing how risk allocation products are presented to an end user, comprising:

an administrative computer workstation programmed with an administrative software application managing information displayed on an end user interface, wherein the administrative software application includes a graphical interface for receiving administrative user input selection of a risk allocation product for displaying and configuring parameters; or product components, wherein the product components include a question component, a valid response component, and a disabled question component;

wherein the parameters describe a relationship between a product and a product property, between different products, or between product properties of different products; or comprise information about which components are to be loaded or executed, when said components should be loaded or executed, and how said components should be displayed to an end user;

a database external to the administrative computer workstation storing the plurality of product components and the parameters that are defined and stored externally from the end user interface, and can be revised or removed without rewriting the end user interface software application;

wherein one or more of the externally stored product components and parameters are loaded into the end user interface without rewriting the end user interface software application;

wherein one or more of the components are automatically disabled based on input received from an end user;

wherein components that are disabled are stored as external data, and wherein the graphical interface for receiving the administrative user input selection displays:

the question component displaying a plurality of questions, the question component also displaying a button to add a new question, a button to modify any of the plurality of questions, and a button to remove any of the plurality of questions;

the valid response component displaying a plurality of response choices to a selected question in the question component, the valid response component also displaying a button to add a new response choice to the selected question, a button to modify any of the plurality of response choices to the selected question, and a button to remove any of the plurality of response choices to the selected question; and the disabled question component displaying at least one question disabled as a result of selecting one of the plurality of response choices to the question selected in the question component, the disabled question component also displaying a button to add a new question disabled by the selected response choice, and a button to delete an existing question disabled by the selected response choice.

2. A method for an administrative user to manage how risk allocation products are presented to an end user, the method comprising the steps of:

storing risk allocation product components externally from an end user interface,
wherein the risk allocation product components are one of: product information, questions related to the product, user selections related to the product and display format, wherein the product components include a question component, a valid response component and a disabled question component;

storing parameters externally from the end user interface,
wherein the parameters describe the relationship between a product and a product property, between different products, or between product properties of different products; or comprise information about which components are to be loaded or executed, when said components should be loaded or executed, and how said components should be displayed to an end user;

storing administrative user instructions received via a graphical interface for receiving administrative user input selection concerning risk allocation product components, or parameters;

loading, based on the stored administrative user instructions, the risk allocation product components into the end user interface without rewriting the end user interface software application; and disabling, based on the stored administrative user instructions, the risk allocation product components without rewriting the end user interface software wherein the graphical interface for receiving the administrative user input selection displays:

the question component displaying a plurality of questions, the question component also displaying a button to add a new question, a button to modify any of the plurality of questions, and a button to remove any of the plurality of questions;

the valid response component displaying a plurality of response choices to a selected question in the question component, the valid response component also displaying a button to add a new response choice to the selected question, a button to modify any of the plurality of response choices to the selected question, and a button to remove any of the plurality of response choices to the selected question; and the disabled question component displaying at least one question disabled as a result of selecting one of the plurality of response choices to the question selected in the question component, the disabled question component also displaying a button to add a new question disabled by the selected response choice, and a button to delete an existing question disabled by the selected response choice.

3. A computer system managing product data presented to an end user, comprising:

memory storing product components,
wherein the product components are displayed on an end user interface, are selectable by an administrative user and are at least one of: product information data, questions related to the product, user selections related to the product and display format, wherein the product components include a question component, a valid response component, and a disabled question component;

memory storing parameters data,
wherein the parameters describe the relationship between a product and a product property, between different products, or between product properties of different products; or comprise information about which components are to be loaded or executed, when said components should be loaded or executed, and how said components should be displayed to an end user; and a computer comprising a graphical interface that receives input from the administrative user concerning the product components and the parameters;

wherein the product components and the parameters are stored external to the end user interface and can be at least one of revised or removed without reprogramming the end user interface wherein the graphical interface that receives the input from the administrative user displays:

the question component displaying a plurality of questions, the question component also displaying a button to add a new question, a button to modify any of the plurality of questions, and a button to remove any of the plurality of questions;

the valid response component displaying a plurality of response choices to a selected question in the question component, the valid response component also displaying a button to add a new response choice to the selected question, a button to modify any of the plurality of response choices to the selected question, and a button to remove any of the plurality of response choices to the selected question; and the disabled question component displaying at least one question disabled as a result of selecting one of the plurality of response choices to the question selected in the question component, the disabled question component also displaying a button to add a new question disabled by the selected response choice, and a button to delete an existing question disabled by the selected response choice.

4. The computer system of claim 3 wherein the products comprise insurance products.

5. The computer system of claim 3 wherein the plurality of questions are to be responded by the end user, and at least one question is disabled based on the end user's actual response to one or more questions.

6. A method for managing product data presented to an end user wherein a plurality of components are modular software objects selectable by an administrative user for display in a separate end user interface and a plurality of parameters governs the interaction among the plurality of components, the method comprising the steps of:

receiving input from the administrative user concerning the plurality of product components and the plurality of parameters via a graphical interface, wherein the product components include a question component, a valid response component, and a disabled question component;

storing, in memory, the plurality of product components and the plurality of parameters externally from the end user interface, whereby the product components and parameters can be at least one of revised or removed without rewriting the end user interface; and loading one or more of the plurality of components into the end user interface without reprogramming the end user interface;

wherein the product components are at least one of: product information, product related questions, user selections related to the product and display format;

wherein the parameters describe the relationship between a product and a product property, between different products, or between product properties of different products; or comprise information about which components are to be loaded or executed, when said components should be loaded or executed, and how said components should be displayed wherein the graphical interface that receives the input from the administrative user displays:

the question component displaying a plurality of questions, the question component also displaying a button to add a new question, a button to modify any of the plurality of questions, and a button to remove any of the plurality of questions;

the valid response component displaying a plurality of response choices to a selected question in the question component, the valid response component also displaying a button to add a new response choice to the selected question, a button to modify any of the plurality of response choices to the selected question, and a button to remove any of the plurality of response choices to the selected question; and the disabled question component displaying at least one question disabled as a result of selecting one of the plurality of response choices to the question selected in the question component, the disabled question component also displaying a button to add a new question disabled by the selected response choice, and a button to delete an existing question disabled by the selected response choice.

7. The method of claim 6 wherein the products comprise insurance products.

8. The method of claim 6 wherein the plurality of questions are to be responded by the end user, and at least one question is disabled based on the end user's actual response to one or more questions.

9. The system of claim 3 wherein questions and responses are presented in a specific order to the end user during product configuration.

10. The method of claim 6, wherein one or more said plurality of components is comprised of questions presented in a specific order to the end user during product configuration by the end user.

11. The method of claim 6, wherein one or more of the components are automatically disabled based on input received from an end user.

12. The method of claim 6, wherein the parameters comprise information about which components are to be loaded or executed, when the components should be loaded or executed, and how the components should be displayed.

* * * * *